(12) United States Patent
Kitamura et al.

(10) Patent No.: US 11,041,234 B2
(45) Date of Patent: Jun. 22, 2021

(54) POWER FOR THERMAL SPRAYING, THERMAL SPRAYING METHOD, AND THERMALLY SPRAYED COATING

(71) Applicant: OERLIKON METCO (JAPAN) LTD., Tokyo (JP)

(72) Inventors: Junya Kitamura, Tokyo (JP); Kazuya Fujimori, Tokyo (JP); Tetsuyoshi Wada, Tokyo (JP)

(73) Assignee: OERLIKON METCO (JAPAN) LTD., Tokyo (JP)

( * ) Notice: Subject to any disclaimer, the term of this patent is extended or adjusted under 35 U.S.C. 154(b) by 0 days.

(21) Appl. No.: 15/572,014

(22) PCT Filed: May 13, 2016

(86) PCT No.: PCT/IB2016/000650
§ 371 (c)(1),
(2) Date: Nov. 6, 2017

(87) PCT Pub. No.: WO2016/181213
PCT Pub. Date: Nov. 17, 2016

(65) Prior Publication Data
US 2018/0119264 A1 May 3, 2018

(30) Foreign Application Priority Data

May 13, 2015 (JP) .............................. JP2015-098632

(51) Int. Cl.
*C23C 4/10* (2016.01)
*C23C 4/134* (2016.01)
(Continued)

(52) U.S. Cl.
CPC ................ *C23C 4/10* (2013.01); *C04B 35/01* (2013.01); *C04B 35/111* (2013.01);
(Continued)

(58) Field of Classification Search
None
See application file for complete search history.

(56) References Cited

U.S. PATENT DOCUMENTS

| | | | | |
|---|---|---|---|---|
| 5,837,048 A | * | 11/1998 | Kelley | ............ C08K 3/08 106/197.01 |
| 6,874,676 B1 | * | 4/2005 | Elkouh | ............ B23K 31/12 219/73.11 |

(Continued)

FOREIGN PATENT DOCUMENTS

| | | |
|---|---|---|
| CN | 101660115 | 3/2010 |
| CN | 102586710 | 7/2012 |

(Continued)

OTHER PUBLICATIONS

Machine Translation of Korea 10-2008-0075589, orginally published in Korean Aug. 2008, 16 pages.*

(Continued)

*Primary Examiner* — Ronak C Patel
(74) *Attorney, Agent, or Firm* — Greenblum & Bernstein, P.L.C.

(57) ABSTRACT

To provide powder for thermal spraying, a method of thermal spraying, and a thermally sprayed coating, which can efficiently work supplying of a dry state powder by using a powder supplying apparatus with a thermal spraying apparatus, and which prevent variation and pulsation or lowering of supplied amount of powder and achieve a required film forming rate, and can obtain a denser coating on the surface of the substrate to be thermally sprayed. [Solution] Powder for thermal spraying 1 is a powder mixture obtained by mixing ceramic powder A whose particle diameter is $D_1$ and ceramic powder B whose particle diameter is $D_2$, wherein $D_1$ is 0.5 to 12μπι as a median diameter, $D_2$ is 0.003 to 0.100μιη as an average particle diameter converted from the BET specific surface area, and (Continued)

when, in the powder mixture, the total weight of the ceramic powder A to be used whose prescribed particle diameter $D_1$ is $W_1$, and the total weight of the ceramic powder B to be added to the ceramic powder A is W2, an addition ratio Y of the ceramic powder B defined by $Y=W_2/(W_1+W_2)$ satisfies: $Y \geq 0.2066 \times D_1^{-0.751}$ and $Y \leq 0.505 \times D_1^{-0.163}$.

22 Claims, 8 Drawing Sheets

(51) Int. Cl.
| | |
|---|---|
| C09D 1/00 | (2006.01) |
| C09D 5/03 | (2006.01) |
| C09D 7/40 | (2018.01) |
| C04B 35/111 | (2006.01) |
| C04B 35/622 | (2006.01) |
| C23C 4/129 | (2016.01) |
| C23C 4/04 | (2006.01) |
| C04B 35/553 | (2006.01) |
| C04B 35/01 | (2006.01) |
| C04B 35/56 | (2006.01) |
| C04B 35/486 | (2006.01) |
| C04B 35/505 | (2006.01) |
| C04B 35/58 | (2006.01) |
| B82Y 30/00 | (2011.01) |

(52) U.S. Cl.
CPC .......... *C04B 35/486* (2013.01); *C04B 35/505* (2013.01); *C04B 35/553* (2013.01); *C04B 35/56* (2013.01); *C04B 35/58* (2013.01); *C04B 35/62222* (2013.01); *C09D 1/00* (2013.01); *C09D 5/031* (2013.01); *C09D 7/68* (2018.01); *C09D 7/69* (2018.01); *C23C 4/04* (2013.01); *C23C 4/129* (2016.01); *C23C 4/134* (2016.01); *B82Y 30/00* (2013.01); *C04B 2235/322* (2013.01); *C04B 2235/3206* (2013.01); *C04B 2235/3208* (2013.01); *C04B 2235/3213* (2013.01); *C04B 2235/3217* (2013.01); *C04B 2235/3224* (2013.01); *C04B 2235/3225* (2013.01); *C04B 2235/3227* (2013.01); *C04B 2235/3229* (2013.01); *C04B 2235/3232* (2013.01); *C04B 2235/3244* (2013.01); *C04B 2235/3246* (2013.01); *C04B 2235/3251* (2013.01); *C04B 2235/3256* (2013.01); *C04B 2235/3258* (2013.01); *C04B 2235/3262* (2013.01); *C04B 2235/3418* (2013.01); *C04B 2235/5409* (2013.01); *C04B 2235/5436* (2013.01); *C04B 2235/5445* (2013.01); *C04B 2235/5454* (2013.01); *C04B 2235/5472* (2013.01)

(56) References Cited

U.S. PATENT DOCUMENTS

| | | | | |
|---|---|---|---|---|
| 2006/0127669 | A1* | 6/2006 | Kogoi | B82Y 30/00 428/403 |
| 2006/0261311 | A1* | 11/2006 | Poulet | C09D 5/084 252/387 |
| 2014/0235426 | A1* | 8/2014 | Pabla | C04B 35/48 501/103 |
| 2016/0016856 | A1 | 1/2016 | Kitamura et al. | |

FOREIGN PATENT DOCUMENTS

| | | |
|---|---|---|
| CN | 102906298 | 1/2013 |
| EP | 1 587 883 | 10/2005 |
| JP | H08 26722 | 1/1996 |
| JP | 2004-262674 | 9/2004 |
| JP | 3814832 | 8/2006 |
| KR | 2008 0075589 | 8/2008 |
| WO | 2014/142019 | 9/2014 |

OTHER PUBLICATIONS

English abstract of Sugiura (JP 2013-006744) (Year: 2013).*
Chinese Office Action issued in CN Application No. 201680038280 (dated Oct. 22, 2018).
Notification of Transmittal of Int'l Search Report and Written Opinion conducted in Int'l Appln. No. PCT/IB2016/000650, Forms PCT/ISA/220, PCT/ISA/210 and PCT/ISA/237 (dated Aug. 5, 2016).
Chinese Office Action issued in CN Application No. 2016800382802 (dated Aug. 30, 2019).
European Office Action/Search Report issued in EP Application No. 16731646 dated Jul. 1, 2019.
Japanese Office Action/Search Report (with English translation) issued in JP Application No. 2017-559099 dated Jun. 2, 2020.

* cited by examiner (a)

(b)

(c)

(a) COLUMNAR (b) LONGITUDINAL CRACKS (c) DENSE (a)

(b)

(c)

(a) ALUMINA (b) YTTRIA (c) YsZ

POWER FOR THERMAL SPRAYING, THERMAL SPRAYING METHOD, AND THERMALLY SPRAYED COATING

TECHNICAL FIELD

The present invention relates to powders for thermal spraying used as a raw material for thermal spraying material such as plasma spraying and high velocity flame spraying, a method of thermal spraying using the powder for thermal spraying, and thermally sprayed coating.

BACKGROUND ART

Conventionally, it has been carried out to form a film by applying thermal spraying with plasma spraying or high velocity flame spraying onto the surface of a substrate by using, for example, ceramic powder as a raw material for a thermal spraying material, to improve abrasion resistance, thermal resistance, etc. of the surface of a substrate to be thermally sprayed, such as metal as an object of spraying.

Currently, as ceramic powder, powder for thermal spraying whose average particle diameter is about 20 to 60 μm is normally used, but in the case where a denser coating is required on the surface of the substrate to be thermally sprayed, a powder whose average particle diameter is 20 μm or smaller, preferably, 10 μm or smaller, is sometimes required.

In order to supply a spray gun with powder for thermal spraying in a thermal sprayer for performing plasma spraying, high velocity flame spraying, etc. with dried powder for thermal spraying, a powder supplying apparatus such as a disk-type powder supplier or a fluidized-bed type powder supplier are used.

However, it is known that the above conventional powder supplying apparatus has a drawback that when the particle diameter of the powder for thermal spraying is 10 μm or smaller, the flowability of the powder is lowered, which causes pulsation and obstruction in supply tube of the powder supplying apparatus.

Accordingly, so-called suspension spraying (slurry spraying) is carried out in which the powder for thermal spraying in a state of suspension in water or alcohol is provided in a thermal spraying apparatus. With this method, even if a powder having a size of 10 μm or smaller is used, obstruction in the supply tube does not occur, and stable supplying is achieved. However, the suspension concentration is about 40 to 50% by weight at most, but practically the upper limit is 20 to 40% by weight. The rest of solvent merely contributes to conveyance of the powder, and does not contribute to film formation itself. Thus, in view of minimization of time and cost consumption increasing the powder supplying amount is theoretically disadvantageous when compared to the case where dried powder alone is supplied.

Patent Literature 1 discloses an inorganic powder mixture for a raw material for single crystal or a raw material for thermal spraying material, which is a mixture of inorganic powder A such as aluminum oxide having an average particle diameter of $D_1$ and powder B such as aluminum oxide having an average particle diameter of $D_2$, in which $D_1$ is not lower than 0.1 μm and not higher than 300 μm, the ratio of $D_1/D_2$ is 50 or more, the powder B is in a range of 0.01 to 2 body parts relative to the body parts of the inorganic powder A, and the repose angle of the powder mixture is not larger than 40°.

CITATION LIST

Patent Literature

[Patent Literature 1] Patent No. JP3814832B2

SUMMARY OF INVENTION

Problems to be Solved by the Invention

However, the results of researches and experiments by the present inventors revealed that the inorganic powder mixture defined by the properties recited in Patent Literature 1 cannot stably supply, in particular, a powder mixture as a raw material for a thermal spraying material through a powder supplier of the thermal spraying apparatus. The results also revealed that it is necessary to further specify the particle diameters of the inorganic powder A and the powder B, and more exactly define the addition ratio (i.e., addition amount) of the powder B to the inorganic powder A, in order to maintain the stable supplying amount of the powder through the powder supplying apparatus of the thermal spraying apparatus, prevent lowering of the film forming rate, and efficiently achieve a denser coating onto the surface of the substrate to be thermally sprayed.

The present invention has been accomplished based on the above new findings of the present inventors.

An object of the present invention is to provide a powder for thermal spraying which enables to efficiently supply dried powder using a powder supplying apparatus of a thermal spraying apparatus, prevents variation and pulsation or lowering of a supplying amount of the powder, achieves a required film forming rate, to thereby form a denser coating on the surface of the substrate to be thermally sprayed, and to provide a thermal spraying method and thermally sprayed coating using the powder for thermal spraying.

Means for Solving the Problems

The above object is achieved by the powder for thermal spraying, thermal spraying method, and thermally sprayed coating according to the present invention. In summary, according to a first aspect of the present invention a powder for thermal spraying is provided which is a powder mixture obtained by mixing ceramic powder A whose particle diameter is $D_1$ and ceramic powder B whose particle diameter is $D_2$, wherein $D_1$ is from 0.5 to 12 μm as a median diameter,
$D_2$ is from 0.003 to 0.100 μm as an average particle diameter converted from the BET specific surface area, and when, in the powder mixture, the total weight of the ceramic powder A to be used whose prescribed particle diameter $D_1$ is $W_1$, and the total weight of the ceramic powder B to be added to the ceramic powder A is $W_2$, an addition ratio Y of the ceramic powder B defined by the following formula $Y=W_2/(W_1+W_2)$ satisfies:

$Y \geq 0.2066 \times (1\ \mu m^{-1} \times D_1)^{-0.751}$ and $Y \leq 0.505 \times (1\ \mu m^{-1} \times D_1)^{-0.163}$.

According to one embodiment of the present invention, the particle diameter $D_1$ of the ceramic powder A is preferably 1 to 10 μm as a median diameter, more preferably 2 to 8 μm.

According to another embodiment of the present invention, the particle diameter $D_2$ of the ceramic powder B is preferably 0.005 to 0.050 μm, more preferably 0.007 to 0.030 μm as an average particle diameter converted from the BET specific surface area.

According to another embodiment of the present invention, the powder mixture is that in which the ceramic powder B adheres to the surface of the ceramic powder A.

According to another embodiment of the present invention, the ceramic powder A and the ceramic powder B are powders comprising materials of the group formed by: oxide ceramics, fluoride ceramics, nitride ceramics carbide ceramics boride ceramics.

The oxide ceramics may for example contain at least one of zirconium (Zr), aluminum (Al), yttrium (Y), cerium (Ce), chrome (Cr), magnesium (Mg), lanthanum (La), manganese (Mn), strontium (Sr), silicon (Si), neodymium (Nd), samarium (Sm), gadolinium (Gd), dysprosium (Dy), erbium (Er), ytterbium (Yb), and/or titanium.

The fluoride ceramics may for example contain yttrium (Y), calcium (Ca) and/or strontium (Sr)

The nitride ceramics may for example contain boron (B), silicon (Si), aluminum (Al), yttrium (Y), chromium (Cr), and/or titanium (Ti).

The carbide ceramics may for example contain boron (B), silicon (Si), titanium (Ti), vanadium (V), zirconium (Zr), niobium (Nb), molybdenum (Mo), tantalum (Ta), hafnium (Hf) and/or tungsten (W).

The boride ceramics may for example contain titanium (Ti), zirconium (Zr), molybdenum (Mo), tantalum (Ta), hafnium (Hf) and/or tungsten (W).

According to another embodiment of the present invention, the ceramic powder A and the ceramic powder B are the same substance.

According to a second aspect of the present invention a method of thermal spraying is provided comprising supplying to a thermal sprayer powder for thermal spraying which is ceramic powder in a dry state with a carrier gas, thermally spraying the powder onto a surface of a substrate to be thermally sprayed with the thermal sprayer, to thereby form a thermally sprayed coating on the surface of the substrate to be thermally sprayed, characterized in that the powder for thermal spraying is the powder for thermal spraying of any of the configurations of the above described first aspect of the invention.

In the second aspect of the present invention, according to one embodiment thereof, the thermal sprayer is a thermal sprayer to carry out thermal plasma spraying, high velocity flame spraying, or flame spraying.

According to a third aspect of the present invention a thermally sprayed coating is provided characterized in that it is a coating formed on a surface of a substrate to be thermally sprayed through a process comprising supplying to a thermal sprayer the powder for thermal spraying having any of the above configurations in a dry state with a carrier gas, and conducting plasma spraying, high velocity flame spraying, or flame spraying on the surface of the substrate to be thermally sprayed, with the thermal sprayer.

According to the powder for thermal spraying of the present invention, the powder can be efficiently supplied by using a powder supplying apparatus, variation and pulsation, or lowering of a supplying amount of the powder are prevented, and a prescribed film forming rate is achieved, to thereby forming a denser coating on the surface of the substrate to be thermally sprayed. Also, according to the thermal spraying method and thermally sprayed coating of the present invention, thermal coating having a dense or columnar structure, or further having a structure with longitudinal cracks in a dense coating can be obtained. Accordingly by thermally spraying with various properties of material of the powder to be used, desired durability, corrosion resistance, abrasion resistance, erosion resistance, thermal resistance and thermal shock resistance can be obtained, and further electrical properties can be enhanced.

MODES FOR CARRYING OUT THE INVENTION

Hereinafter, the powder for thermal spraying, the thermal spraying method, and the thermally sprayed coating of the present invention will be described in more detail with reference to drawings.

Example 1

Figure 1:
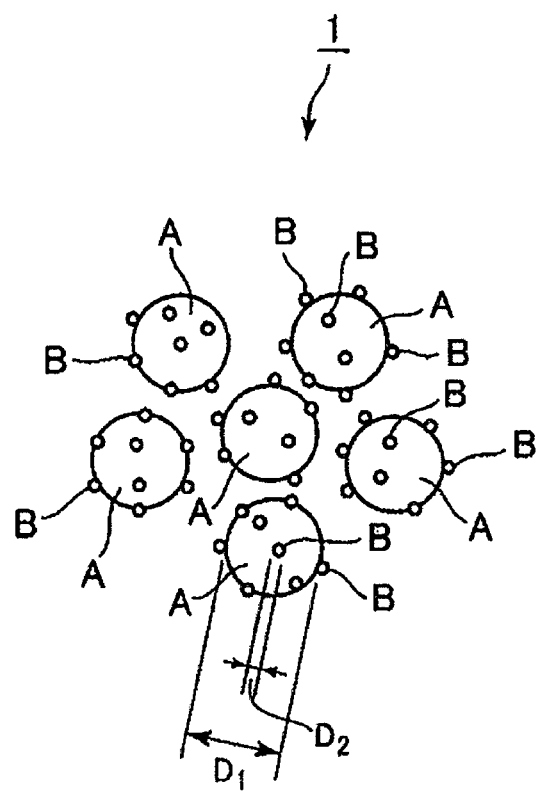
FIG. 1 A figure showing an outline constitution of a powder for thermal spraying of the present invention.

As shown in FIG. 1, the powder for thermal spraying 1 of the present invention is a powder mixture obtained by mixing ceramic powder A having a large particle diameter $D_1$ and ceramic powder B having a small particle diameter $D_2$, in which the ceramic powder B adheres to the surface of the ceramic powder A.

Figure 2:
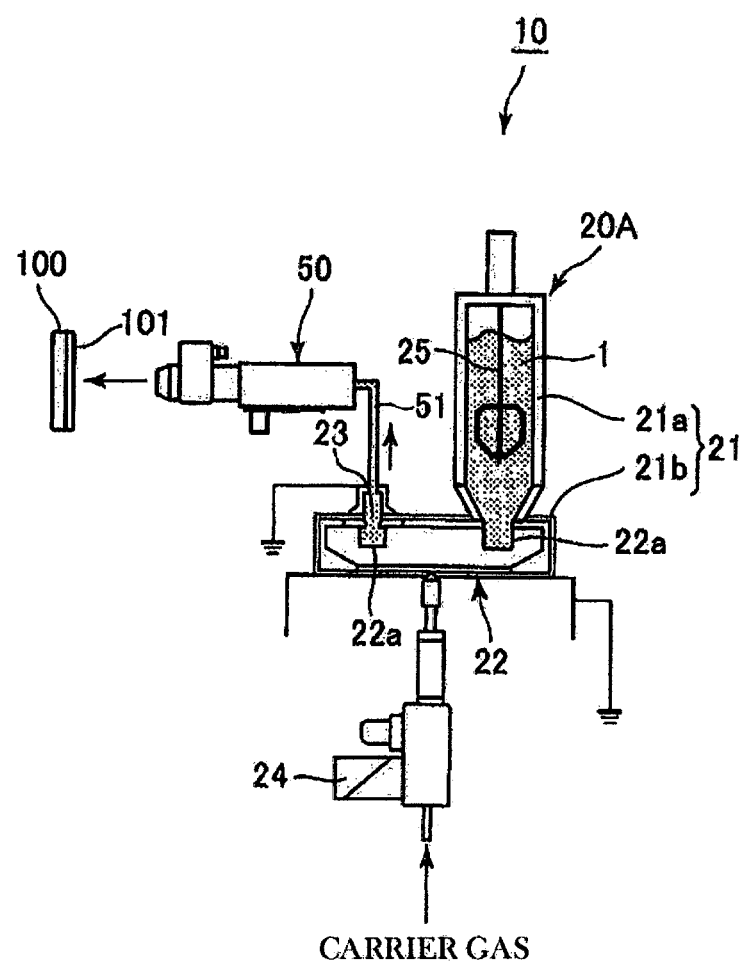
FIG. 2 A cross-sectional figure showing an outline constitution of one example of a powder supplier for the powder for thermal spraying of the present invention.
Figure 3:
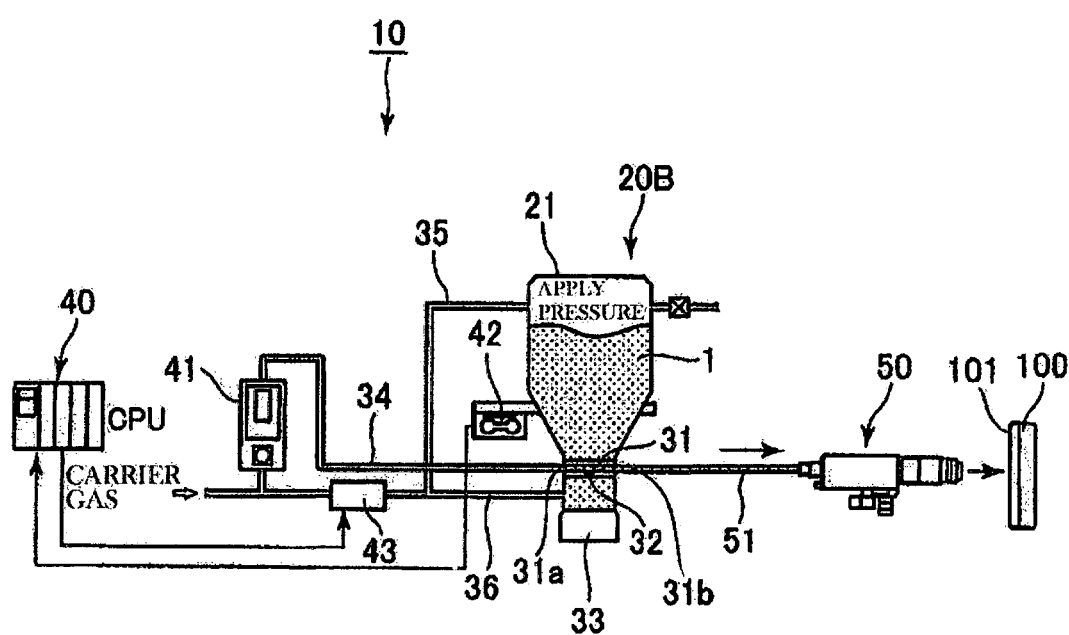
FIG. 3 A cross-sectional figure showing an outline constitution of another example of the powder supplier for the powder for thermal spraying of the present invention.

The powder for thermal spraying 1 of the present invention is preferably used for a thermal spraying apparatus 10 using a powder supplying apparatus 20 (20A, 20B) which is well-known to those skilled in the art, including a disk-type powder supplier 20A as shown in FIG. 2 (e.g., "Metco Single/Twin-120 (tradename), product of Oerlikon Metco Ltd.) or a fluidized-bed type powder supplier 20B as shown in FIG. 3 (e.g., "Metco 9MP" (tradename), product of Oerlikon Metco Ltd.).

As for the thermal spraying apparatus 10, this spraying apparatus 10 uses a disk-type powder supplier 20A as a powder supplying apparatus 20. The disk-type powder supplier 20A is equipped with a container 21 holding the powder for thermal spraying 1, and the container 21 is constituted with a hopper 21a having a stirrer 25 for stirring the powder for thermal spraying 1 filling the container, and with a disk container 21b having a rotary-driven powder disk 22. In the powder disk 22, a groove 22a is formed in a peripheral portion, and the powder 1 from the hopper 21a falls in the groove 22a of the powder disk 22. The container 21 (hopper 21a and disk container 21b) is sealed, and to the disk container 21b, carrier gas (normally, an inert gas such as argon and nitrogen is used) is supplied, and the gas is compressed. The disk container 21b has an ejection port 23 which is positioned on the opposition side of the side where the hopper 21a is mounted and which injects the powder 1 in the disk container 21b with the carrier gas. This ejection port 23 is connected to a thermal sprayer (spray gun 50) of the thermal spraying apparatus 10 with a powder supplying tube 51. Accordingly, the powder 1 transported from the hopper 21a to the inside of the disk container 21b is transported from the inside of the disk container 21b to the spray gun 50 in a dry state via the powder supplying tube 51 with pressure of the carrier gas, and the powder 1 is thermally sprayed with the spray gun 50 onto a substrate to be thermally sprayed 100, to thereby form a thermally sprayed coating 101 on the surface of the substrate 100.

The flow rate of the carrier gas is regulated with a controller 24, or the supplying amount of the powder for thermal spraying 1 is regulated by, for example, controlling the revolution speed of the powder disk 22.

FIG. 3 shows a thermal spraying apparatus 10 using a fluidized-bed type powder supplier 20B as a powder supplying apparatus 20. The fluidized-bed type powder supplier 20B has a sealed hopper 21, a container holding the powder for thermal spraying 1. Under the hopper 21 is placed an air vibrator 33, and at the lower part of the inside of the hopper 21 is placed a pickup shaft 31 positioned at the upper part of the air vibrator 33 and having a pickup hole 32. The pickup shaft 31 has an incoming port 31a and an ejection port 31b, the incoming port 31a is connected to a carrier gas supplying line 34, and the ejection port 31b is connected to one end of the powder supplying tube 51. The other end of the powder supplying tube 51 is connected to the thermal sprayer (spray gun 50) of the thermal spraying apparatus 10.

The carrier gas is transported to the above carrier gas supplying line 34, is provided to the hopper 21 through a first gas line 35 which is connected to the upper part of the hopper 21, and pressurizes the inside of the hopper 21. Through a second gas line 36 connected to the lower part of the hopper 21, the carrier gas is ejected to the lower region of the hopper 21 to form a fluidized bed in the lower region of the hopper 21. The air vibrator 33 encourages supplying of the powder 1 and fluidization of the powder 1 inside the container 21.

When the carrier gas is supplied to the pickup shaft 31 from the carrier gas supplying line 34 with the above configuration, the powder 1 placed at the fluidized bed region is absorbed into the pickup shaft 31 via the pickup hole 32, and supplied to the spray gun 50 from the inside of the hopper 21 with the carrier gas through the powder supplying tube 51. The powder for thermal spraying 1 is thermally sprayed onto the substrate to be thermally sprayed 100 with the spray gun 50, to form a thermally sprayed coating 101 on the surface of the substrate 100.

The amount of the powder for thermal spraying 1 supplied to the spray gun 50 is regulated by regulating the gas supplying amount to the first and second gas lines 35 and 36 with an E/P regulator 43 regulated by a regulator 40, based on data such as the amount of carrier gas flowing through the carrier gas supplying line 34 which is measured by a flowmeter 41, and the amount of powder inside the hopper 21 which is measured by a load cell 42 mounted to the hopper 21.

As the powder supplying apparatus 20, various types thereof are commercially available other than the powder suppliers 20A and 20B. As can be understood from the foregoing, any of the powder supplying apparatus 20 has a sealed container 21 pressurized with gas for holding powder, and conveys the powder 1 inside the container 21 to the thermal sprayer 50 with the carrier gas through the powder supplying tube 51.

In the present Example, the following is defined:
(A) in the disk-type powder supplier 20A;
  Amount of powder supplied: 5 to 60 g/min
  Pressure of carrier gas: 50 to 950 mbar
  Flow rate of carrier gas: 2 to 15 NLPM
  Inner diameter of powder supplying tube 51: 3 to 8 mm
(B) in fluidized-bed type powder supplier 20B
  Amount of powder supplied: 5 to 60 g/min
  Pressure of carrier gas: 50 to 950 mbar
  Flow rate of carrier gas: 2 to 15 NLPM
  Inner diameter of powder supplying tube 51: 3 to 8 mm The results of study and experiments by the present inventors revealed that when the particle diameter of the powder for thermal spraying 1 is about 20 to 40 µm, these conventional powder suppliers 20A and 20B can be used, but when the particle diameter thereof is 10 µm or smaller practically, flowability lowers, pulsation occurs, and blocking occurs in the supplying tube 51 of the powder suppliers 20A and 20B.

In contrast, as mentioned above, it is revealed that if the powder for thermal spraying 1 is a powder mixture obtained by mixing the ceramic powder A having a large particle diameter $D_1$ and the ceramic powder B having a small particle diameter $D_2$, a thermally sprayed coating which is dense and has good flowability can be obtained even if particles having a small diameter of not larger than 12 µm is used as the ceramic powder A by specifying the mixing conditions.

More specifically, in the powder for thermal spraying 1 of the present invention, the particle diameter $D_1$ of the ceramic powder A is set as 0.5 to 12 µm as a median diameter, and the particle diameter $D_2$ of the ceramic powder B is set as 0.003 to 0.100 µm as an average particle diameter converted from the BET specific surface area.

In this regard, the "median diameter" which represents a particle diameter of ceramic powder, and "average particle diameter converted from the BET specific surface area," used in the present invention will be explained.

In the present invention, the particle diameter of the ceramic powder A, or the median diameter $D_1$ is 0.5 to 12 µm, and a particle diameter within this range is generally measured with a laser diffraction scattering type particle size measuring device (for instance, "MT3300EXII" (tradename) product of MicrotracBEL Corp.). In a laser diffraction scattering type particle size measuring device, the size of powder, or particles as a collective entity, is generally represented as a distribution of abundance ratio for every size (particle diameter) of a large number of measuring results, which is called a particle size distribution. As a standard for abundance ratio in a distribution, volume standard (volume distribution) and number standard (number distribution), etc. are used, and in the laser diffraction scattering method, volume distribution is practically used commonly. In this volume distribution, 50% particle diameter is the "median diameter."

The particle diameter of the ceramic powder B in the present invention, which is the average particle diameter $D_2$ converted from the BET specific surface area, is 0.003 to 0.100 µm, which is difficult to measure with a laser diffraction scattering type particle size measuring device, and so an average particle diameter is generally obtained by conversion from the BET specific surface area. As a method for measuring a specific surface area of powder, a gas adsorption method is widely used, as illustrated by a flow-type specific surface area automatic measuring device ("Flow-soap III2305/2310" (tradename), product of Shimadzu Corp.). By using a measured specific surface area and a theoretical density of the ceramics constituting particles, and by postulating that constituent particles are spherical, the "average particle diameter converted from the BET specific surface area" can be obtained.

In the present invention, when the particle diameter D1 of the ceramic powder A is less than 0.5 µm, heat capacity of the particles is lowered, and even if heated during thermal spraying, the particles are immediately cooled down, and do not contribute to film formation. In this case, by moving the substrate close to an ejection port, particles are forced to arrive at the substrate before the particles are cooled down, but if the substrate is moved too close thereto, heat by thermal flame become intense, resulting in damage to the substrate. Accordingly, the particle diameter $D_1$ of the ceramic powder A is 0.5 µm or more, preferably 1 µm or more, more preferably 2 µm or more. Meanwhile, if the particle diameter $D_1$ of the ceramic powder A is larger than 12 µm, it becomes difficult to obtain a dense coating. Accordingly, the particle diameter $D_1$ of the ceramic powder A is 12 µm or smaller, preferably 10 µm or smaller, more preferably 8 µm or smaller.

If the particle diameter $D_2$ of the ceramic powder B is less than 0.003 µm, the bulk density (bulk specific gravity) becomes too low, and the supplying amount of the powder is reduced. When the supplying amount of the powder is reduced, film-forming rate becomes low, and becomes inefficient. Accordingly, the particle diameter $D_2$ of the ceramic powder B is 0.003 µm or larger, preferably 0.005 µm or larger, more preferably 0.007 µm or larger. Meanwhile, if the particle diameter $D_2$ of the ceramic powder B is larger than 0.100 µm, the particles stick to the surface of ceramic powder A, reducing the effect of unravelling the agglomeration between particles of the ceramic powder A. Accordingly, the particle diameter $D_2$ of the ceramic powder B is 0.100 µm or smaller, preferably 0.050 µm or smaller, more preferably 0.030 µm or smaller.

Accordingly, in the powder for thermal spraying 1 of the present invention, the particle diameter (median diameter) $D_1$ of the ceramic powder A is 0.5 to 12 µm, preferably 1 to 10 µm, more preferably 2 to 8 µm. Meanwhile, the particle diameter (average particle diameter converted from the BET specific surface area) $D_2$ of the ceramic powder B is 0.003 to 0.100 µm, preferably 0.005 to 0.050 µm, more preferably 0.007 to 0.030 µm.

The present inventors have carried out many researches and experiments by using the ceramic powders A and B having the above particle diameters, and have found that it is necessary, for stably maintaining the flowability of the powder, to limit the addition amount of the ceramic powder B to the ceramic powder A having a prescribed particle diameter to a certain range.

More specifically, when the entire weight of the ceramic powder A to be used having a prescribed particle diameter $D_1$ is $W_1$, and the entire weight of the ceramic powder B to be added to this ceramic powder A is $W_2$, the addition ratio Y of the ceramic powder B is represented by the following formula:

$$Y = W_2/(W_1 + W_2)$$

Accordingly, the addition amount $W_2$ of the ceramic powder B in the powder mixture is:

$$W_2 = W_1(Y/(1-Y)).$$

Figure 4:
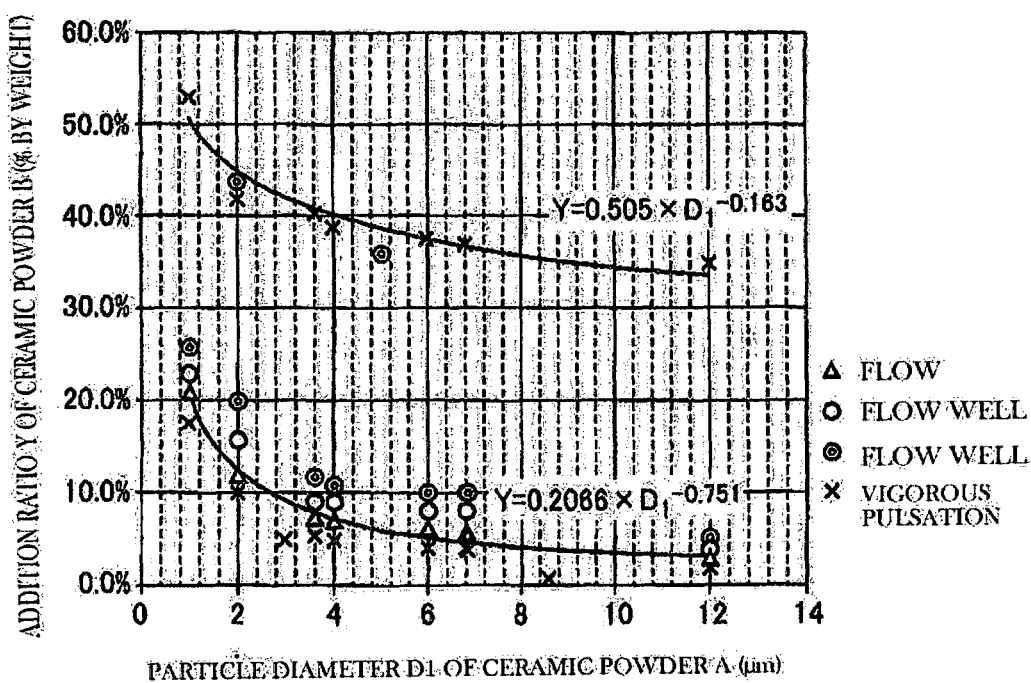
FIG. 4 A graph showing flowability test results for the powder for thermal spraying of the present invention.

In this case, the addition ratio Y of the ceramic powder B, as will be explained in detail in relation to the later Experimental Examples, as shown in FIG. 4, needs to be:

$$Y = 0.2066 \times (1\ \mu m^{-1} \times D_1)^{-0.751} \text{ or larger, and} \qquad \text{Formula (1):}$$

$$Y = 0.505 \times (1\ \mu m^{-1} \times D_1)^{-0.163} \text{ or smaller.} \qquad \text{Formula (2):}$$

When the addition ratio Y of the ceramic powder B is too small, namely it does not meet the above lower limit formula (1), the flowability of the powder for thermal spraying obtained by mixing the ceramic powders A and B having prescribed particle diameters lowers, pulsation occurs, and blockage occurs in the supplying tube, inhibiting stable supplying of the powder.

When the addition ratio Y of the ceramic powder B is too large, namely it does not meet the above upper limit formula (2), in this case also, the flowability of the powder lowers, pulsation occurs, and blockage occurs in the supplying tube, inhibiting stable supplying of the powder. In addition, since the ceramic powder B, a fine powder, is low in bulk density (bulk specific gravity), the larger the addition ratio Y, or the addition amount $W_2$, the smaller the supplying amount of the powder to the spray gun. When the supplying amount is small, the film-forming rate becomes low and inefficient.

The particle diameter $D_2$ of the ceramic powder B used may take any certain size or any different size, so far as it satisfies the above addition ratio Y, or the above addition amount $W_2$. In a case of two kinds of particles which have different particle diameters $D_2$, even if the particles are coarse or fine particles falling outside the range of 0.003 to 0.100 µm, a powder ranging from 0.003 to 0.100 µm can be prepared by mixing fine particles and coarse particles, to thereby achieve the effect However, when the particle diameter goes beyond 0.2 µm, the sticking amount of particles having particle diameter $D_1$ to the ceramic powder A becomes lower; which reduce the effect. Meanwhile, when the particle diameter is 0.001 µm or smaller, the powder is low in volume, which reduces the supplying amount and so is inefficient.

As mentioned above, the powder for thermal spraying 1 of the present invention is a powder mixture in which the ceramic powder B adheres to the surface of the ceramic powder A, and the ceramic powder A and the ceramic powder B are powders comprising materials of the group formed by: oxide ceramics, fluoride ceramics, nitride ceramics carbide ceramics boride ceramics.

The oxide ceramics may for example contain at least one of zirconium (Zr), aluminum (Al), yttrium (Y), cerium (Ce), chrome (Cr), magnesium (Mg), lanthanum (La), manganese (Mn), strontium (Sr), silicon (Si), neodymium (Nd), samarium (Sm), gadolinium (Gd), dysprosium (Dy), erbium (Er), ytterbium (Yb), and/or titanium.

The fluoride ceramics may for example contain yttrium (Y), calcium (Ca) and/or strontium (Sr).

The nitride ceramics may for example contain boron (B), silicon (Si), aluminum (Al), yttrium (Y), chromium (Cr), and/or titanium (Ti).

The carbide ceramics may for example contain boron (B), silicon (Si), titanium (Ti), vanadium (V), zirconium (Zr), niobium (Nb), molybdenum (Mo), tantalum (Ta), hafnium (Hf) and/or tungsten (W).

The boride ceramics may for example contain titanium (Ti), zirconium (Zr), molybdenum (Mo), tantalum (Ta), hafnium (Hf) and/or tungsten (W).

More specifically, examples of the ceramic powders A and B include yttria-stabilized zirconia (YsZ: Y occupies 7 to 14% by weight), pure alumina, pure yttria, yttria-aluminum garnet (YAG), ceria, pure chromia, and lanthanum strontium manganese oxide yttrium fluoride, boron carbide, tungsten carbide, boron nitride and titanium boride, for example.

The ceramic powder A and the ceramic powder B are preferably the same substance, but may be different from each other. Also, as the ceramic powder B, a plurality of kinds of oxide ceramics different in material may be used.

A mixing apparatus for mixing the ceramic powder A and the ceramic powder B is not necessarily limited, but a wet method or a dry method may be used, and a normally-used mill, crusher, or mixer may be used. Examples thereof include a ball mill, vibration mill, jet mill, and V-type mixer.

The powder for thermal spraying 1 of the present invention which is constituted by ceramics of oxide, fluoride, nitride, carbide and/or boride having the above configuration can perform stable powder supply by using the powder supplying apparatus 20, such as a disk-type powder supplier 20A and a fluidized-bed type powder supplier 20B, which are explained by referring to FIGS. 2 and 3.

Accordingly, by performing thermal spraying onto the surface of the substrate 100 to be thermally sprayed by using the powder for thermal spraying 1 of the present invention, a dense coating 101 can be formed. For instance, when yttria is used as the powder for thermal spraying 1, durability and corrosion resistance against plasma gas including halogen gas are enhanced. When alumina is used, abrasion resistance and electric properties (reduction of leakage current, voltage resistance) are enhanced. Also, when yttria-stabilized zirconia (YsZ) is used, a dense coating through which air and oxygen gas cannot permeate can be formed, and the powder can be used for an electrolyte portion in a solid oxide fuel cell (SOFC). Furthermore, when yttria-stabilized zirconia (YsZ) is used, a coating resembling a columnar structure which has conventionally been made through the PVD (physical vapor deposition) film forming method can be prepared efficiently at a low cost. Also, when yttria-stabilized zirconia (YsZ) is used, so-called a DVC (dense vertically-cracked) structure can also be prepared which has longitudinal cracks in a dense coating. The DVC structure can be prepared by using powder having a general particle diameter of several 10 μm with plasma spraying, but the DVC coating prepared by the present invention is denser and abrasion resistance and erosion resistance are enhanced.

Next, the powder for thermal spraying of the present invention will be explained in more detail with reference to Experimental Examples, and the function and effect thereof will be explained in contrast to powder for thermal spraying as Comparative Examples.

Experimental Examples (Ceramic Powder A, Ceramic Powder B)

(A) First Experiments (Experimental Examples 1 to 12 and Comparative Examples 1 to 8)

In Experimental Examples 1 to 12 and Comparative Examples 1 to 8, as shown in Tables 1 and 2, alumina A, B, C, and D were used as the ceramic powder A and a fumed alumina was used as the ceramic powder B.

Also, in Experimental Examples 1 to 12 and Comparative Examples 1 to 8, the particle diameters ($D_1$, $D_2$) and weights ($W_1$, $W_2$) of the ceramic powder A and the ceramic powder B, and an addition ratio (Y) (represented by % by weight) of the ceramic powder B are as shown in Tables 1 and 2.

A powder mixture was obtained by adding a prescribed amount of the ceramic powder B to a prescribed amount of the ceramic powder A as shown in Tables 1 and 2, and stirring the admixture for 5 minutes with V-type mixer (tradename: "VM-2L type," product of Tsutsui Scientific Instruments, Co., Ltd.). After stirring, the powder mixture was subjected to a flowability test. The experimental results are shown in "evaluation" and "remarks" in Tables 1 and 2, and FIG. 4.

(B) Second Experiments (Experimental Examples 13 to 21 and Comparative Examples 9 to 14)

In Experimental Examples 13 to 21 and Comparative Examples 9 to 14, as shown in Table 3, 8YsZ-A, B, and C were used as the ceramic powder A, and nano YsZ was used as the ceramic powder B.

Also, in Experimental Examples 13 to 21 and Comparative Examples 9 to 14, the particle diameters ($D_1$, $D_2$) and weights ($W_1$, $W_2$) of the ceramic powder A and ceramic powder B, and an addition ratio (Y) (represented by % by weight) of the ceramic powder B are as shown in Table 3.

A powder mixture was obtained by adding a prescribed amount of the ceramic powder B to a prescribed amount of the ceramic powder A as shown in Table 3, and stirring the admixture for 5 minutes with a V-type mixer (tradename: "VM-2L type," product of Tsutsui Scientific Instruments, Co., Ltd.). After stirring, the powder mixture was subjected to a flowability test. The experimental results are shown in "evaluation" and "remarks" in Table 3, and FIG. 4.

(C) Third Experiments (Experimental Examples 22 and 23)

In Experimental Examples 22 and 23, as shown in Table 4, yttrias A and B were used as the ceramic powder A and nano yttria A was used as the ceramic powder B.

Also, in Experimental Examples 22 and 23, the particle diameters ($D_1$, $D_2$) and weights ($W_1$, $W_2$) of the ceramic powder A and ceramic powder B, and an addition ratio (Y) (represented by % by weight) of the ceramic powder B in the powder mixture (powder for thermal spraying) of the ceramic powder A and ceramic powder B are as shown in Table 4.

A powder mixture was obtained by adding a prescribed amount of the ceramic powder B to a prescribed amount of the ceramic powder A as shown in Table 4, and stirring the admixture for 5 minutes with a V-type mixer (tradename: "VM-2L type," product of Tsutsui Scientific Instruments, Co., Ltd.). After stirring, the powder mixture was subjected to a flowability test. The experimental results are shown in "evaluation" and "remarks" in Table 4, and FIG. 4.

(D) Fourth Experiments (Experimental Examples 24 to 27 and Comparative Examples 15 to 17)

In Experimental Examples 24 to 27 and Comparative Examples 15 to 17, as shown in Table 5, aluminas E, F, and B, C were used as the ceramic powder A and transition aluminas A and B, nanoceria, fine powder alumina, and nanoyttria B were used as the ceramic powder B.

Also, in Experimental Examples 24 and 27 and Comparative Examples 15 to 17, the particle diameters ($D_1$, $D_2$) and weights ($W_1$, $W_2$) of the ceramic powder A and ceramic powder B, and an addition ratio (Y) (represented by % by weight) of the ceramic powder B are as shown in Table 5.

A powder mixture was obtained by adding a prescribed amount of the ceramic powder B to a prescribed amount of the ceramic powder A as shown in Table 5, and stirring the admixture for 5 minutes with a V-type mixer (tradename: "VM-2L type," product of Tsutsui Scientific Instruments, Co., Ltd.). After stirring, the powder mixture was subjected to a flowability test. The experimental results are shown in "evaluation" and "remarks" in Table 5, and FIG. 4. Notably, Comparative Examples 15 and 16 are cases recited in the Patent Literature 1, and the evaluation in the flowability test result was "x: not flow."

(E) Fifth Experiments (Comparative Examples 18 to 20)

In Comparative Examples 18 to 20, as shown in Table 5, crude powder, crude yttria, and crude YsZ which have a coarse particle diameter were used as the ceramic powder A, but the ceramic powder B was not mixed.

Also, in Comparative Examples 18 to 20, the particle diameter ($D_1$) of the ceramic powder A is as shown in Table 5, and experimental results for flowability tests are shown in "evaluation" and "remarks" in Table 5, and FIG. 4.

(Powder Supplying Apparatus)

Tests for flowability of the powder mixture (powder for thermal spraying) of the ceramic powder A and ceramic powder B shown in Experimental Examples 1 to 27 and Comparative Examples 1 to 17, and the ceramic powder A alone shown in Comparative Examples 18 to 20 were conducted by supplying the powders prepared as shown in Tables 1 to 5 to a powder supplying apparatus presently used practically, and observing visually the flowing mode of the powder at that time.

As the powder supplying apparatus 10, in the present experiment, "Metco Twin-120-A" (tradename), product of Oerlikon Metco Ltd. which has a pair of the disk-type powder supplier 20A, namely the container 21 (hopper 21a and disk container 21b), gas supplying line 51, etc. and illustrated and explained in FIG. 2 was used. The powder supplying amount of the powder supplying apparatus 20 used in the experiment had an accuracy of ±1%.

Various powders for thermal spraying 1 shown in Tables 1 to 5 were held in the sealed container 21, and a prescribed amount of the powders were conveyed to the thermal sprayer (spray gun) 50 through the powder supplying tube 51 by regulating the revolution of the powder disk 22 and the flow rate of the carrier gas. The powder supplying tube 51 of the powder supplier 20A used in the present experiment has an inner diameter of 4 mm, and a length of 5000 mm, and Amount of powder supplied: 10 to 30 g/min
Pressure of carrier gas: +100 to 500 mbar to atmospheric pressure
Flow rate of carrier gas: 4 to 15 NLPM The experimental results of the present experiment are shown in "evaluation" in Tables 1 to 5 and FIG. 4. FIG. 4 recites "Δ, ○, ⊚, x" in accordance with the above Experimental Examples and Comparative Examples, and the following evaluation criteria. In the "evaluation,"

Δ: flow. Pulsation occurs once.
○: flow well. No pulsation occurs.
⊚: flow well. No pulsation occurs.
x: flow but amount of powder supplied reduces. Vigorous pulsation occurs.

From the relationship between the particle diameter $D_1$ of the ceramic powder A and the addition ratio of the ceramic powder B in the experimental examples showing the "lower end," "x: flow but amount of powder supplied reduces. Vigorous pulsation occurs" in the experimental results, a curve (following formula (1)) representing the lower limit value of the addition ratio Y of the ceramic powder B is obtained, and from the relationship between the particle diameter $D_1$ of the ceramic powder A and the addition ratio of the ceramic powder B in the experimental examples showing the "upper limit," "x: flow but amount of powder supplied reduces. Vigorous pulsation occurs" in the experimental results, a curve (following formula (2)) showing the upper limit of the addition ratio Y of the ceramic powder B was obtained.

$$Y=0.2066\times(1\ \mu m^{-1}\times D_1)^{-0.751} \qquad (1)$$

$$Y=0.505\times(1\ \mu m^{-1}\times D_1)^{-0.163} \qquad (2)$$

From FIG. 4, it was revealed that on the outside the lower limit value and the upper limit value as shown in the above formulas (1) and (2), the flowability and amount to be supplied of the powder are lowered, and stable supply of the powder cannot be carried out.

TABLE 1

| | Ceramic powder A | | | Ceramic powder B | | | | |
|---|---|---|---|---|---|---|---|---|
| | Composition | D1 Particle diameter μm | W1 Weight g | Composition | D2 Particle diameter μm | W2 Weight g | Addition ratio Y Weight % | Evaluation | Note |
| Comparative Example 1 | Alumina A | 1 | 100 | Fumed alumina | 0.018 | 22.0 | 18.0% | X | vigorous pulsations |
| Experimental Example 1 | Alumina A | 1 | 100 | Fumed alumina | 0.018 | 26.6 | 21.0% | Δ | flow, pulsation occurs once. |
| Experimental Example 2 | Alumina A | 1 | 100 | Fumed alumina | 0.018 | 30.0 | 23.1% | ○ | flow well. No pulsation occurs. |
| Experimental Example 3 | Alumina A | 1 | 100 | Fumed alumina | 0.018 | 35.0 | 25.9% | ⊚ | flow well. No pulsation occurs. |
| Comparative Example 2 | Alumina A | 1 | 100 | Fumed alumina | 0.018 | 110.0 | 52.4% | X | flow but the amount supplied is half of Experimental Example 3 |
| Comparative Example 3 | Alumina B | 2 | 100 | Fumed alumina | 0.018 | 11.0 | 9.9% | X | vigorous pulsations |

TABLE 1-continued

| | Ceramic powder A | | | Ceramic powder B | | | | | |
|---|---|---|---|---|---|---|---|---|---|
| | Composition | D1 Particle diameter μm | W1 Weight g | Composition | D2 Particle diameter μm | W2 Weight g | Addition ratio Y Weight % | Evaluation | Note |
| Experimental Example 4 | Alumina B | 2 | 100 | Fumed alumina | 0.018 | 13.6 | 12.0% | Δ | flow, pulsation occurs once. |
| Experimental Example 5 | Alumina B | 2 | 100 | Fumed alumina | 0.018 | 19.0 | 16.0% | ○ | flow well. No pulsation occurs. |
| Experimental Example 6 | Alumina B | 2 | 100 | Fumed alumina | 0.018 | 25.0 | 20.0% | ◉ | flow well. No pulsation occurs. |
| Comparative Example 4 | Alumina B | 2 | 100 | Fumed alumina | 0.018 | 67.0 | 40.1% | X | flow but the amount supplied is half of Experimental Example 6 |
| Comparative Example 5 | Alumina C | 4 | 100 | Fumed alumina | 0.018 | 5.3 | 5.0% | X | vigorous pulsations |
| Experimental Example 7 | Alumina C | 4 | 100 | Fumed alumina | 0.018 | 7.5 | 7.0% | Δ | flow, pulsation occurs once. |
| Experimental Example 8 | Alumina C | 4 | 100 | Fumed alumina | 0.018 | 10.0 | 9.1% | ○ | flow well. No pulsation occurs. |
| Experimental Example 9 | Alumina C | 4 | 100 | Fumed alumina | 0.018 | 25.0 | 20.0% | ◉ | flow well. No pulsation occurs. |
| Comparative Example 6 | Alumina C | 4 | 100 | Fumed alumina | 0.018 | 65.0 | 39.4% | X | flow but the amount supplied is half of Experimental Example 9 |

TABLE 2

| | Ceramic powder A | | | Ceramic powder B | | | | | |
|---|---|---|---|---|---|---|---|---|---|
| | Composition | D1 Particle diameter μm | W1 Weight g | Composition | D2 Particle diameter μm | W2 Weight g | Addition ratio Y Weight % | Evaluation | Note |
| Comparative Example 7 | Alumina D | 6.7 | 100 | Fumed alumina | 0.018 | 4.2 | 4.0% | X | vigorous pulsations |
| Experimental Example 10 | Alumina D | 6.7 | 100 | Fumed alumina | 0.018 | 5.5 | 5.2% | Δ | flow, pulsation occurs once. |
| Experimental Example 11 | Alumina D | 6.7 | 100 | Fumed alumina | 0.018 | 9.0 | 8.3% | ○ | flow well. No pulsation occurs. |
| Experimental Example 12 | Alumina D | 6.7 | 100 | Fumed alumina | 0.018 | 11.0 | 9.9% | ◉ | flow well. No pulsation occurs. |
| Comparative Example 8 | Alumina D | 6.7 | 100 | Fumed alumina | 0.018 | 60.0 | 37.5% | X | flow but the amount supplied is half of Experimental Example 12 |

TABLE 3

| | Ceramic powder A | | | Ceramic powder B | | | | | |
|---|---|---|---|---|---|---|---|---|---|
| | Composition | D1 Particle diameter μm | W1 Weight g | Composition | D2 Particle diameter μm | W2 Weight g | Addition ratio Y Weight % | Evaluation | Note |
| Comparative Example 9 | 8YsZ-A | 3.6 | 100 | nanoYsZ | 0.015 | 6.0 | 5.7% | X | vigorous pulsations |
| Experimental Example 13 | 8YsZ-A | 3.6 | 100 | nanoYsZ | 0.015 | 7.5 | 7.0% | Δ | flow, pulsation occurs once. |
| Experimental Example 14 | 8YsZ-A | 3.6 | 100 | nanoYsZ | 0.015 | 10.0 | 9.1% | ○ | flow well. No pulsation occurs. |
| Experimental Example 15 | 8YsZ-A | 3.6 | 100 | nanoYsZ | 0.015 | 14.0 | 12.3% | ◉ | flow well. No pulsation occurs. |
| Comparative Example 10 | 8YsZ-A | 3.6 | 100 | nanoYsZ | 0.015 | 67.0 | 40.1% | X | flow but the amount supplied is half of Experimental Example 15 |
| Comparative Example 11 | 8YsZ-B | 6 | 100 | nanoYsZ | 0.015 | 4.7 | 4.5% | X | vigorous pulsations |
| Experimental Example 16 | 8YsZ-B | 6 | 100 | nanoYsZ | 0.015 | 6.4 | 6.0% | Δ | flow, pulsation occurs once. |

TABLE 3-continued

| | Ceramic powder A | | | Ceramic powder B | | | | | |
|---|---|---|---|---|---|---|---|---|---|
| | Composition | D1 Particle diameter μm | W1 Weight g | Composition | D2 Particle diameter μm | W2 Weight g | Addition ratio Y Weight % | Evaluation | Note |
| Experimental Example 17 | 8YsZ-B | 6 | 100 | nanoYsZ | 0.015 | 9.0 | 8.3% | ○ | flow well. No pulsation occurs. |
| Experimental Example 18 | 8YsZ-B | 6 | 100 | nanoYsZ | 0.015 | 11.5 | 10.3% | ◎ | flow well. No pulsation occurs. |
| Comparative Example 12 | 8YsZ-B | 6 | 100 | nanoYsZ | 0.015 | 60.0 | 37.5% | X | flow but the amount supplied is half of Experimental Example 18 |
| Comparative Example 13 | 8YsZ-C | 12 | 100 | nanoYsZ | 0.015 | 2.0 | 2.0% | X | vigorous pulsations |
| Experimental Example 19 | 8YsZ-C | 12 | 100 | nanoYsZ | 0.015 | 3.1 | 3.0% | Δ | flow, pulsation occurs once. |
| Experimental Example 20 | 8YsZ-C | 12 | 100 | nanoYsZ | 0.015 | 4.2 | 4.0% | ○ | flow well. No pulsation occurs. |
| Experimental Example 21 | 8YsZ-C | 12 | 100 | nanoYsZ | 0.015 | 5.3 | 5.0% | ◎ | flow well. No pulsation occurs. |
| Comparative Example 14 | 8YsZ-C | 12 | 100 | nanoYsZ | 0.015 | 54.0 | 35.1% | X | flow but the amount supplied is half of Experimental Example 21 |

TABLE 4

| | Ceramic powder A | | | Ceramic powder B | | | | | |
|---|---|---|---|---|---|---|---|---|---|
| | Composition | D1 Particle diameter μm | W1 Weight g | Composition | D2 Particle diameter μm | W2 Weight g | Addition ratio Y Weight % | Evaluation | Note |
| Experimental Example 22 | Yttria A | 5 | 100 | Nanoyttria A | 0.027 | 55.0 | 35.5% | ◎ | flow well, no pulsation occurs |
| Experimental Example 23 | Yttria B | 2 | 100 | Nanoyttria A | 0.027 | 70.0 | 41.2% | ◎ | flow well, no pulsation occurs |

TABLE 5

| | Ceramic powder A | | | Ceramic powder B | | | | | |
|---|---|---|---|---|---|---|---|---|---|
| | Composition | D1 Particle diameter μm | W1 Weight g | Composition | D2 Particle diameter μm | W2 Weight g | Addition ratio Y Weight % | Evaluation | Note |
| Comparative Example 15 | Alumina E | 3 | 100 | Transition alumina A | 0.010 | 1.0 | 1.0% | X | Case of Patent Literature 1; not flow |
| Comparative Example 16 | Alumina F | 8.5 | 100 | Transition alumina A | 0.010 | 0.2 | 0.2% | X | Case of Patent Literature 1; not flow |
| Experimental Example 24 | Alumina B | 2 | 100 | Transition alumina B | 0.007 | 19.0 | 16.0% | ○ | Flow well. No pulsation occurs. |
| Experimental Example 25 | Alumina C | 4 | 100 | Transition alumina B | 0.007 | 10.0 | 9.1% | ○ | Flow well. No pulsation occurs. |
| Experimental Example 26 | Alumina C | 4 | 100 | Nanoceria | 0.005 | 10.0 | 9.1% | ○ | Flow well. No pulsation occurs. |
| Comparative Example 17 | Alumina C | 4 | 100 | Fine powder alumina | 0.113 | 10.0 | 9.1% | X | Vigorous pulsation |
| Experimental Example 27 | Alumina C | 4 | 100 | Nanoyttria B | 0.040 | 10.0 | 9.1% | ○ | Flow well. No pulsation occurs. |
| Comparative Example 18 | Crude alumina | 30 | 100 | — | — | — | — | ◎ | Flow well. Coarse particles |
| Comparative Example 19 | Crude yttria | 30 | 100 | — | — | — | — | ◎ | Flow well. Coarse particles |
| Comparative Example 20 | Crude YsZ | 65 | 100 | — | — | — | — | ◎ | Flow well. Coarse particles |

Example 2

Thermal spraying was conducted onto the substrate to be thermally sprayed 100 by using the powder for thermal spraying 1 of the present invention which was described in Example 1. In the present Example, plasma spraying, which is a method of thermally spraying utilizing high temperature and high pressure plasma generated by discharging while causing an inert gas to flow between electrodes, was adopted. The powder supplying apparatus 20 used was "Metco Twin-120-A" (tradename), product of Oerlikon Metco Ltd., which is a disk-type powder supplier 20A by which the flowing tests were made, and "TriplexPro-210" (tradename), product of Oerlikon Metco Ltd., equipped with a nozzle of 6.5 mm, 9 mm was used as the thermal sprayer (plasma spray gun) 50.

As the substrate to be thermally sprayed 100, stainless steel (SUS304) was used, and this was subjected to pretreatment for roughening the substrate surface by grid blast. By the pretreatment, the surface roughness Rz of the substrate surface was about 40 μm.

Subsequently, by using the spray gun 50, the powder for thermal spraying 1 was thermally sprayed on the substrate surface pretreated. The powder for thermal spraying 1 used in Experimental Examples 28, 29, 30, 31 to 33, 34, 35, and 36 have compositions shown in the above Experimental Examples 3, 6, 9, 15, 18, 21, and 22 as shown in Table 6, respectively, and the powder for thermal spraying 1 used in Comparative Examples 21 to 23 have the compositions shown in the above Comparative Examples 18 to 20 as shown in Table 6, respectively. Also, the flow rate and pressure of the carrier gas, supplying amount of the powder, and the spraying distance for thermal spraying for the powder for thermal spraying in the powder supplying apparatus are as shown in Table 6. The thermal spraying conditions A, B, and C in Table 6 are as shown in Table 7.

The thicknesses of the thermally sprayed coating on the substrate surfaces and the coating structures thus obtained in Experimental Examples 28 to 36 and Comparative Examples 21 to 23 are shown in Table 6. FIGS. 5 to 8 show the cross-sectional photographs of the obtained coating structures.

Figure 5:
FIGS. 5(a) to 5(c) are photographs showing the cross-sectional surfaces of the thermally sprayed coatings formed by using the powder for thermal spraying of the present invention.
Figure 5:
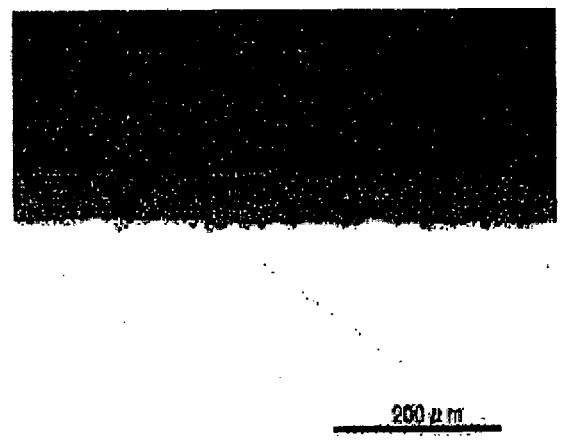
Figure 5:
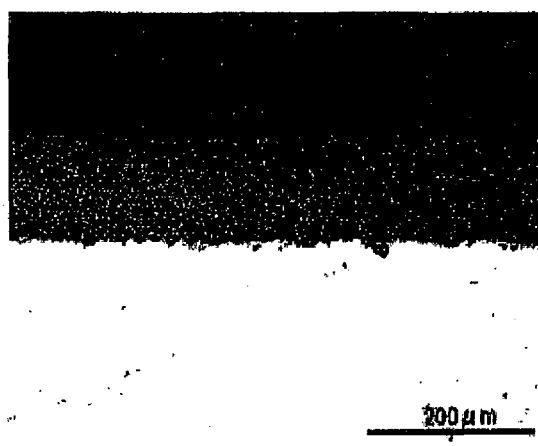
Figure 6:
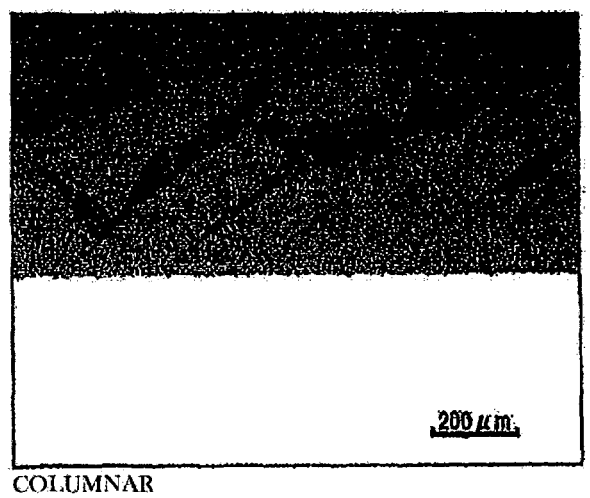
FIGS. 6(a) to 6(c) are photographs showing the cross-sectional surfaces of the thermally sprayed coatings formed by using the powder for thermal spraying of the present invention.
Figure 6:
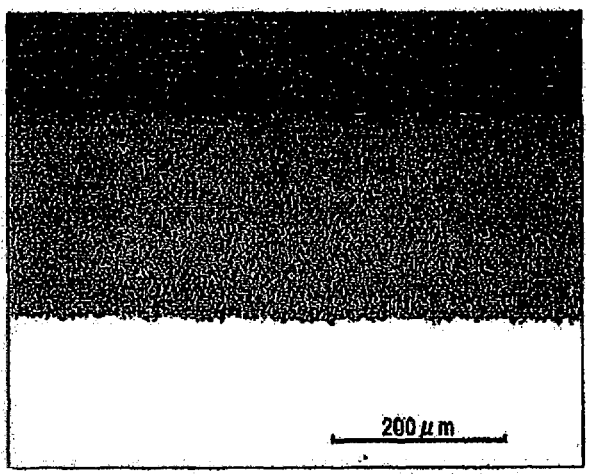
Figure 6:
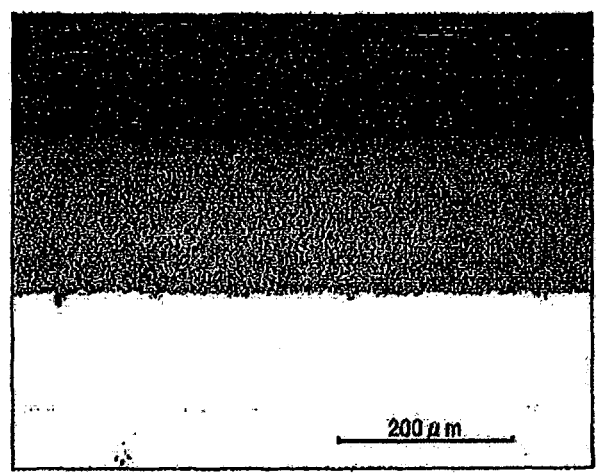
Figure 7:
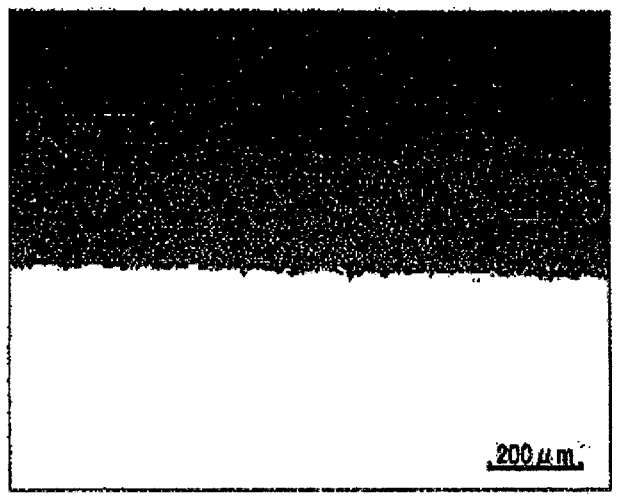
FIGS. 7(a) to 7(c) are photographs showing the cross-sectional surfaces of the thermally sprayed coatings formed by using the powder for thermal spraying of the present invention.
Figure 7:
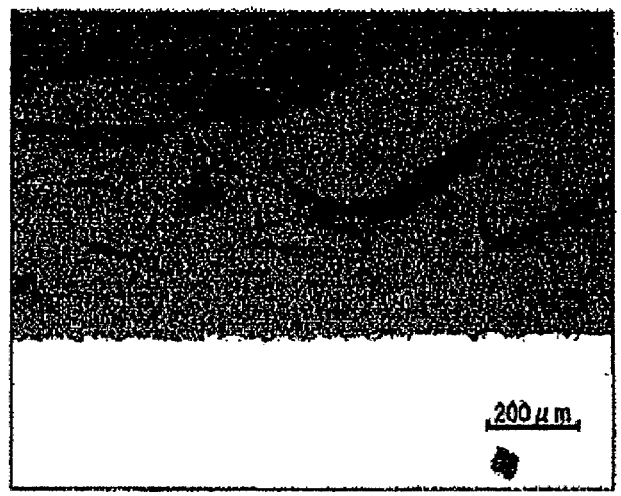
Figure 7:
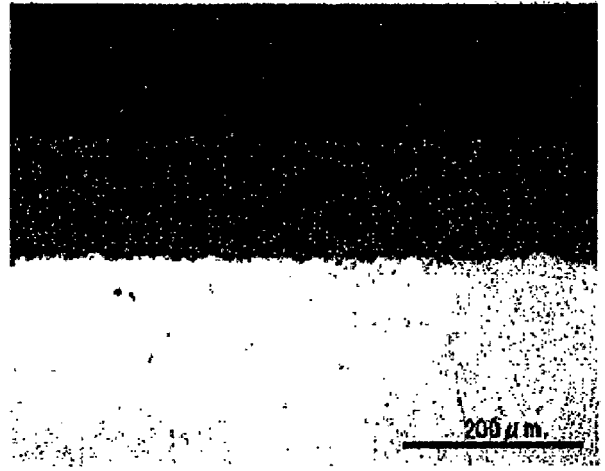
Figure 8:
FIGS. 8(a) to 8(c) are photographs showing the cross-sectional surfaces of the thermally sprayed coatings formed by using conventional powder for thermal spraying.
Figure 8:
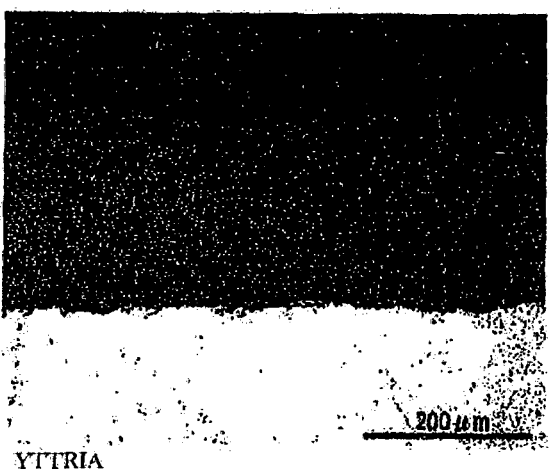
Figure 8:
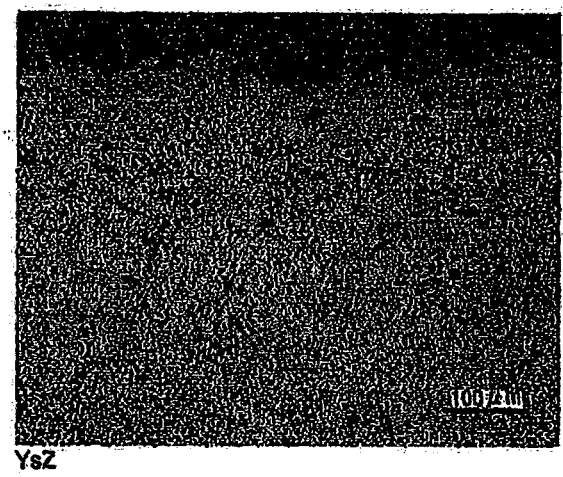

As can be understood from Table 6, and FIGS. 5(*a*), (*b*), (*c*), 6(*c*), and 7(*c*), in the Experimental Examples 28 to 30, 33, and 36 according to the present invention, it is found that a denser coating is made on the substrate. With reference to FIG. 6(*a*), the thermally sprayed coating obtained in Experimental Example 31 has a coating layer of a columnar structure, and with reference to FIGS. 6(*b*), 7(*a*), and (*b*), the thermally sprayed coatings obtained in Experimental Examples 32, 34, and 35 have a structure with longitudinal cracks in a dense coating.

TABLE 6

| | | Powder for thermal spraying A/B | Carrier gas Flow rate (NLPM) | Carrier gas Pressure (mbar) | Powder supplying amount g/min | Thermal spraying condition | Distance for thermal spraying mm | Film thickness μm | Coating structure | |
|---|---|---|---|---|---|---|---|---|---|---|
| Experimental Example 28 | (Experimental Example 3) | Alumina A/Fumed alumina | 14 | 900 | 10 | A | 90 | 200 | Dense | FIG. 5(a) |
| Experimental Example 29 | (Experimental Example 6) | Alumina B/Fumed alumina | 14 | 850 | 10 | A | 90 | 200 | Dense | FIG. 5(b) |
| Experimental Example 30 | (Experimental Example 9) | Alumina C/Fumed alumina | 14 | 800 | 15 | A | 90 | 200 | Dense | FIG. 5(c) |
| Experimental Example 31 | (Experimental Example 15) | 8YsZ-A/NanoYsZ | 13 | 800 | 10 | A | 50 | 200 | Columnar | FIG. 6(a) |
| Experimental Example 32 | | | 13 | 800 | 10 | A | 70 | 200 | Longitudinal cracks | FIG. 6(b) |
| Experimental Example 33 | | | 13 | 800 | 10 | A | 90 | 200 | Dense | FIG. 6(c) |
| Experimental Example 34 | (Experimental Example 18) | 8YsZ-B/NanoYsZ | 13 | 700 | 20 | A | 50 | 200 | Longitudinal cracks | FIG. 7(a) |
| Experimental Example 35 | (Experimental Example 21) | 8YsZ-C/NanoYsZ | 13 | 600 | 25 | A | 50 | 200 | Longitudinal cracks | FIG. 7(b) |
| Experimental Example 36 | (Experimental Example 22) | Yttria A/Nano yttria A | 14 | 700 | 10 | A | 90 | 200 | Dense | FIG. 7(c) |
| Comparative Example 21 | (Comparative Example 18) | Crude alumina | 3 | 200 | 40 | B | 100 | 200 | Porous | FIG. 8(a) |
| Comparative Example 22 | (Comparative Example 19) | Crude yttria | 3 | 250 | 40 | B | 100 | 200 | Porous | FIG. 8(b) |
| Comparative Example 23 | (Comparative Example 20) | Crude YsZ | 3 | 200 | 60 | C | 100 | 200 | Porous | FIG. 8(c) |

TABLE 7

| Thermal spraying condition | A | B | C |
|---|---|---|---|
| Inner diameter of nozzle [mm] | 6.5 | 9 | 9 |
| Inner diameter of powder injector [mm] | 1.5 | 1.8 | 1.8 |
| Electric current [A] | 480 | 540 | 400 |
| Voltage [V] | 126 | 70 | 110 |
| Flow rate of argon [NLPM] | 135 | 40 | 50 |
| Flow rate of helium [NLPM] | 55 | — | — |
| Flow rate of hydrogen gas [NLPM] | — | 5 | 5 |
| Transfer speed of robot [mm/s] | 1000 | 1000 | 1000 |
| Pitch distance [mm] | 4 | 5 | 5 |

The above experimental results show that the columnar structure or the DVC structure with longitudinal cracks in a dense coating using, for instance, yttria stabilized zirconia obtained by thermally spraying the powder for thermal spraying of the present invention, can improve durability, erosion resistance, thermal resistance, thermal shock resistance, gas impermeability, etc. in a heat barrier coating set up on a moving blade or stationary blade of a power generating gas turbine and an aircraft jet engine. Notably, when yttria is used as the ceramic powder, durability, abrasion resistance, erosion resistance, and corrosion resistance against plasma gas including a halogen gas is enhanced. When alumina is used, abrasion resistance is enhanced and electric properties (reduction of leakage current, voltage resistance) are improved.

By contrast, it is understood that the thermally sprayed coatings obtained in Comparative Examples 21 to 23 which use the powder for thermal spraying which differs from the present invention have a porous coating layer, as seen in FIGS. 8(a) to (c), and are inferior to the ones of the present invention in abrasion resistance, corrosion resistance, erosion resistance, thermal resistance, thermal shock resistance, gas impermeability, etc.

The above description clarifies the mode of film forming of thermally sprayed coating by thermally spraying the powder for thermal spraying of the present invention through plasma spraying onto substrate to be thermally sprayed 100. According to the results of the experiment by the present inventors, it is found that a thermally sprayed coating having similar excellent properties can also be obtained by high velocity flame spraying, which is a method of thermal spraying utilizing a combustion flame of a high pressure oxygen and hydrocarbon fuel gas or heating oil, or a flame spraying utilizing a combustion flame of oxygen and hydrocarbon fuel gas.

REFERENCE SIGNS LIST

1 Powder for thermal spraying
10 Thermal spraying apparatus
20 Powder supplying apparatus
20A Disk-type powder supplier
20B Fluidized-bed type powder supplier
50 Spray gun (thermal sprayer)
51 Powder supplying tube
100 Substrate to be thermally sprayed
101 Thermally sprayed coating

The invention claimed is:

1. A thermal spray powder with improved flowability during thermal spraying comprising a thermal sprayable powder mixture that is in a state that is sprayable by a thermal spray gun and that is obtained by mixing ceramic powder A whose particle diameter is D1 and ceramic powder B whose particle diameter is D2, wherein D1 is 0.5 to 10 μm as a median diameter, D2 is 0.003 to 0.100 μm as an average particle diameter converted from the BET specific surface area, wherein, in the thermal sprayable powder mixture, the particles of ceramic powder A are not agglomerated with each other, wherein, in the thermal sprayable powder mixture, the particles of ceramic powder B adhere to surfaces of the particles of ceramic powder A, wherein, in the thermal sprayable powder mixture that is in the state that is sprayable by a thermal spray gun, the total weight of the ceramic powder A is W1, and the total weight of the ceramic powder B is W2, and wherein the relative weight of the ceramic powder B defined by the following formula $Y = W2/(W1+W2)$ satisfies:

$Y \geq 0.2066 \times (1 \, \mu m^{-1} \times D1)^{-0.751}$ and $Y \leq 0.505 \times (1 \, \mu m^{-1} \times D1)^{-0.163}$.

2. The powder for thermal spraying according to claim 1, wherein the particle diameter D1 of the ceramic powder A is 1 to 10 μm as a median diameter.

3. The powder for thermal spraying according to claim 1, wherein the particle diameter D1 of the ceramic powder A is 2 to 8 μm as a median diameter.

4. The powder for thermal spraying according to claim 1, wherein the particle diameter D2 of the ceramic powder B is 0.005 to 0.050 μm as an average particle diameter converted from the BET specific surface area.

5. The powder for thermal spraying according to claim 1, wherein the particle diameter D2 of the ceramic powder B is 0.007 to 0.030 μm as an average particle diameter converted from the BET specific surface area.

6. The powder for thermal spraying according to claim 1, wherein the ceramic powder A and the ceramic powder B are the same substance.

7. The powder for thermal spraying according to claim 1, wherein the ceramic powder A and the ceramic powder B are powders comprising materials of a group formed by oxide ceramics.

8. The powder for thermal spraying according to claim 7, wherein the oxide ceramics comprise at least one of zirconium (Zr), aluminum (Al), yttrium (Y), cerium (Ce), chrome (Cr), magnesium (Mg), lanthanum (La), manganese (Mn), strontium (Sr), silicon (Si), neodymium (Nd), samarium (Sm), gadolinium(Gd), dysprosium(Dy), erbium (Er), ytterbium (Yb), or titanium.

9. The powder for thermal spraying according to claim 1, wherein the ceramic powder A and the ceramic powder B are powders comprising materials of a group formed by fluoride ceramics.

10. The powder for thermal spraying according to claim 9, wherein the fluoride ceramics comprise at least one of yttrium (Y), calcium (Ca) or strontium (Sr).

11. The powder for thermal spraying according to claim 1, wherein the ceramic powder A and the ceramic powder B are powders comprising materials of a group formed by nitride ceramics.

12. The powder for thermal spraying according to claim 11, wherein the nitride ceramics comprise at least one of boron (B), silicon (Si), aluminum (Al), yttrium (Y), chromium (Cr), or titanium (Ti).

13. The powder for thermal spraying according to claim 1, wherein the ceramic powder A and the ceramic powder B are powders comprising materials of a group formed by carbide ceramics.

14. The powder for thermal spraying according to claim 13, wherein the carbide ceramics comprise at least one of boron (B), silicon (Si), titanium (Ti), vanadium (V), zirconium (Zr), niobium (Nb), molybdenum (Mo), tantalum (Ta), hafnium (Hf) or tungsten (W).

15. The powder for thermal spraying according to claim 1, wherein the ceramic powder A and the ceramic powder B are powders comprising materials of a group formed by boride ceramics.

16. The powder for thermal spraying according to claim 15, wherein the boride ceramics comprise at least one of titanium (Ti), zirconium (Zr), molybdenum (Mo), tantalum (Ta), hafnium (Hf) or tungsten (W).

17. The powder for thermal spraying according to claim 1, wherein the ceramic powder A and the ceramic powder B are powders comprising at least one of yttria-stabilized zirconia, pure alumina, pure yttria, yttria-alumina garnet, ceria, pure chromia and lanthanum strontium manganese oxide yttrium fluoride, boron carbide, tungsten carbide, boron nitride, and titanium boride.

18. The powder for thermal spraying according to claim 17, wherein the ceramic powder A and the ceramic powder B are powders comprise yttria-stabilized zirconia.

19. A thermal spray powder with improved flowability during thermal spraying comprising a thermal sprayable powder mixture that is in a state that is sprayable by a thermal spray gun and that is obtained by mixing ceramic powder A whose particle diameter is D1 and ceramic powder B whose particle diameter is D2, wherein D1 is 0.5 to 10 μm as a median diameter, D2 is 0.003 to 0.100 μm as an average particle diameter converted from the BET specific surface area, wherein, in the thermal sprayable powder mixture, the particles of ceramic powder A are not agglomerated with each other, wherein, in the thermal sprayable powder mixture, the particles of ceramic powder B adhere to surfaces of the particles of ceramic powder A, wherein, in the thermal sprayable powder mixture, the total weight of the ceramic powder A to be used whose prescribed particle diameter D1 is W1, and the total weight of the ceramic powder B to be added to the ceramic powder A is W2, an addition ratio Y of the ceramic powder B defined by the following formula $Y=W2/(W1+W2)$ satisfies: $Y \geq 0.2066 \times (1\ \mu m^{-1} \times D1)^{-0.751}$ and $Y \leq 0.505 \times (1\ \mu m^{-1} \times D1)^{-0.163}$, wherein the thermal spray powder is in the state that is sprayable by a thermal spray gun and is structured and arranged to flow without pulsation under the following conditions:

a flow rate of between 4 and 15 NLPM;

a carrier gas pressure of between +100 and 500 mbar to atmospheric pressure; and a supply rate of 10 to 30 g/min wherein, when, in the thermal sprayable powder mixture, the total weight of the ceramic powder A to be used whose prescribed particle diameter D1 is W1, and the total weight of the ceramic powder B to be added to the ceramic powder A is W2, an addition ratio Y of the ceramic powder B defined by the following formula $Y=W2/(W1+W2)$ satisfies: $Y \geq 0.2066 \times (1\ \mu m^{-1} \times D1)^{-0.751}$ and $Y \leq 0.505 \times (1\ \mu m^{-1} \times D1)^{-0.163}$.

20. A method of thermal spraying comprising supplying to a thermal sprayer powder for thermal spraying which is ceramic powder in a dry state with a carrier gas, thermally spraying the powder onto a surface of a substrate to be thermally sprayed with the thermal sprayer, to thereby form a thermally sprayed coating on the surface of the substrate to be thermally sprayed, wherein the powder for thermal spraying is the powder for thermal spraying according to claim 1.

21. The method of thermal spraying according to claim 20, wherein the thermal sprayer is a thermal sprayer conducting plasma spraying, high velocity flame spraying, or flame spraying.

22. A thermally sprayed coating which is a coating formed on a surface of a substrate to be thermally sprayed through a process comprising supplying to a thermal sprayer the powder for thermal spraying according to claim 1 in a dry state with a carrier gas, and conducting plasma spraying, high velocity flame spraying, or flame spraying on the surface of the substrate to be thermally sprayed, with the thermal sprayer.

* * * * *